United States Patent
Rehle et al.

(10) Patent No.: US 6,755,094 B2
(45) Date of Patent: Jun. 29, 2004

(54) ANTI-NOISE GEAR

(75) Inventors: Winfried Rehle, Ob-Bidingen (DE); Martin Stowasser, Marktoberdorf (DE); Herbert Weitnauer, Kaufbeuren (DE)

(73) Assignee: Agco GmbH & Co. (DE)

( * ) Notice: Subject to any disclaimer, the term of this patent is extended or adjusted under 35 U.S.C. 154(b) by 0 days.

(21) Appl. No.: 09/930,553

(22) Filed: Aug. 14, 2001

(65) Prior Publication Data

US 2002/0112556 A1 Aug. 22, 2002

(30) Foreign Application Priority Data

Aug. 15, 2000 (GB) .............................................. 0019930

(51) Int. Cl.[7] .............................................. F16H 55/14
(52) U.S. Cl. ...................................................... 74/443
(58) Field of Search ......................... 74/439, 443, 445; 295/7

(56) References Cited

U.S. PATENT DOCUMENTS

| | | | | |
|---|---|---|---|---|
| 1,235,734 A | * | 8/1917 | Stange | 464/87 |
| 1,852,789 A | * | 4/1932 | Peterson | 74/443 |
| 2,267,311 A | * | 12/1941 | Smith | 295/7 |
| 3,307,419 A | * | 3/1967 | Brickett et al. | 74/411 |
| 3,581,593 A | * | 6/1971 | Robinson | 181/207 |
| 3,843,188 A | * | 10/1974 | Kirschner | 295/7 |
| 3,857,296 A | * | 12/1974 | Tsunoda | 74/443 |
| 4,317,388 A | | 3/1982 | Wojcikowski | |
| 4,635,501 A | | 1/1987 | Mizuno et al. | |
| 6,047,607 A | * | 4/2000 | Weber et al. | 74/409 |

FOREIGN PATENT DOCUMENTS

| | | |
|---|---|---|
| EP | 251243 | 6/1987 |
| FR | 2 678 343 | * 12/1992 |
| JP | 58-109765 | * 6/1983 |

* cited by examiner

*Primary Examiner*—William C. Joyce
(74) *Attorney, Agent, or Firm*—MacMillan, Sobanski & Todd, LLC

(57) ABSTRACT

An anti-noise gear wheel against which at least one vibration damping mass made from a heat-resistant and oil-resistant material is coupled in order to de-tune its vibration behavior. In order to produce an anti-noise gear wheel which is simple to assemble and whose anti-vibration mass can be mounted in the gear assembly area using standard means, the anti-vibration mass is applied against the gear wheel by its full surface under a defined contact pressure. As a result, the use of adhesive to make an anti-noise gear wheel, which has been common practice to date, can be dispensed with.

31 Claims, 1 Drawing Sheet

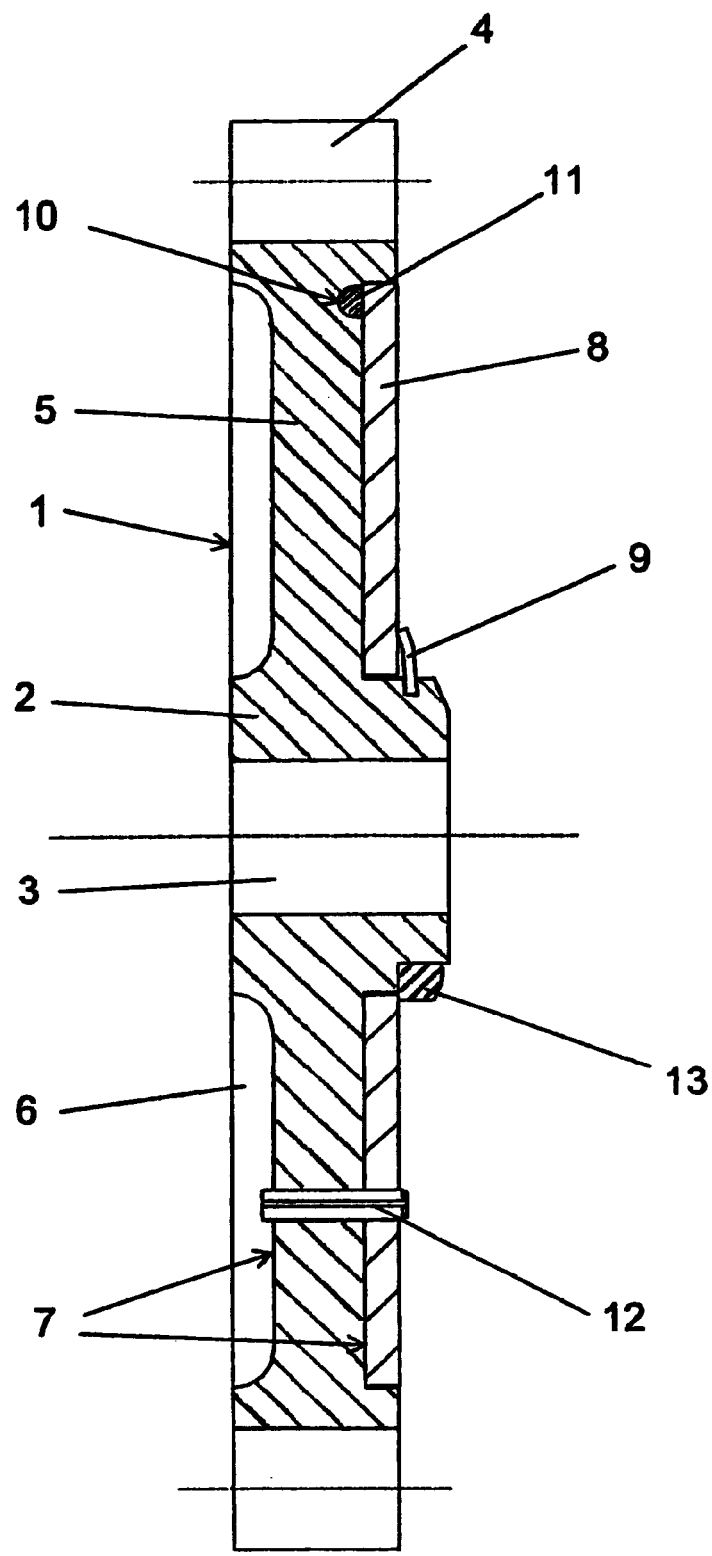

ANTI-NOISE GEAR

BACKGROUND OF THE INVENTION

The invention relates to reducing noise from a gear wheel by coupling a vibration damping mass to the gear wheel.

DE 43 31 165 A1 describes a chain drive mechanism of this generic type having a chain wheel, on either side of which an elastic rubber disc is secured in order to reduce noise. The rubber discs are attached to the chain wheel by means of adhesive or by sintering. This known solution is not suitable for a gear wheel used in a gear system subjected to high load and in constant contact with hot gear oil. On the contrary, it would pose the greatest possible risk of failure in such a gear system since it would be impossible to guarantee that the rubber discs would not come unstuck, at least partially.

DE 39 07 153 describes a pair of gear wheels, the teeth of which are provided with an annular disc on opposing sides in the region of their ring gear in order to damp the noise caused by the meshing of their teeth. The point at which the noise arises is therefore relatively well encapsulated by the annular discs so that the directly generated sound can not be transmitted further. However, this advantage comes at a price since more space is required for the gear wheels at the side. Furthermore, the vibrations resulting as the teeth mesh are largely unaffected as they are transmitted as a structure-borne sound across the entire body of the gear wheels. Consequently, depending on how the annular disc is attached, the noise transmitted across the side faces of the gear wheels is damped to a greater or lesser degree and noise-damping of the gear wheels as a whole is not satisfactory.

SUMMARY OF THE INVENTION

The objective of the invention is to provide an anti-noise gear wheel which is simple to construct and whose vibration-damping mass can be mounted in the gear system using standard means.

The features by which this objective is achieved are set out in the characterising part of the main claim. By an appropriate selection of the material used for the vibration damping mass, the specific weight of which should not differ too greatly from the specific weight of metals, full surface application on the gear wheel can be achieved by appropriate means without any specific complexity. As a result, the vibration behaviour of the gear wheel is effectively damped in such a way that it is no longer necessary, as has been the case to date, to use adhesive to couple the vibration damping mass firmly with the gear wheel. Bonding methods are not practical for use in gear assembly lines and automatically mean that separate working sections have to be provided in the areas where the gear system is assembled or elsewhere, so that appropriate steps can be taken to protect personnel from the toxic vapours generated when using adhesive.

In one practical embodiment of the invention, which affords the highest degree of noise damping, the vibration damping mass is designed as an annular disc which covers a predominant proportion of the side face of the gear wheel almost as far as the ring gear.

In order to take the load off the means for applying the annular disc against the gear wheel, the gear wheel is provided with a hub on which the annular disc is retained.

By virtue of one advantageous embodiment of the invention in which a single element only is needed in order to apply the annular disc, the annular disc is applied under the force of an element arranged on the hub, pre-tensioned to a defined degree against the side face of the gear wheel, the element being a shaft-retaining ring.

Another embodiment of the invention is characterised by the fact that the annular disc is applied against the side face under the force of a ring pressed onto the hub.

Another embodiment of the invention is characterised in that the annular disc is coupled with the gear wheel by means of screws and/or rivets.

In order to secure efficient noise damping even in applications in which the gear wheel is susceptible to rotary vibrations originating in the drive, the invention proposes another feature whereby the annular disc is prevented from rotating relative to the gear wheel by means of a rotary locking mechanism.

A first solution to securing the annular disc consists in using a clamping sleeve to prevent the annular disc from rotating.

A second solution to securing the annular disc is to prevent the annular disc from rotating by embedding an element with a high friction value (O ring) in the end face.

In order to keep the space requirement to the sides of the gear wheel to a minimum, the invention proposes another feature whereby the annular disc is mounted in a recess of the gear wheel.

A not inconsiderable improvement to noise damping can be achieved if the vibration damping mass is provided in the form of at least two annular discs arranged one directly on top of the other and the vibration damping mass is made from a material with an E-modulus comparable with that of the material of the gear wheel.

BRIEF DESCRIPTION OF THE DRAWING

The invention will be described in more detail below with reference to sole drawing illustrating an anti-noise gear wheel seen from a side view.

DETAILED DESCRIPTION OF THE PREFERRED EMBODIMENT

The gear wheel illustrated in the drawing and denoted as a whole by reference 1 has an inner hub 2 with an end-to-end bore 3 for receiving a shaft, not illustrated, and an outer ring gear 4. Ring gear 4 and hub 2 are joined to one another by means of a disc-shaped web 5, which is slimmer than the ring gear 4 and the hub 2. The web 5 is arranged symmetrically relative to the ring gear 4 and accordingly forms two lateral recesses 6 on the gear wheel 1 having radially flat side faces 7.

In the embodiment illustrated here, one of the recesses 6 is used for mounting an annular disc 8 with as great a mass as possible, which is either solid or consists of several thin discs made from any metal, preferably steel, as is the case here. The annular disc 8 lies with its entire surface applied against the side face 7 under a defined contact pressure.

In a first embodiment, illustrated in the top half of the gear wheel 1, the defined, optimal contact pressure, determined by testing, is generated by a pre-tensioned shaft-retaining ring 9 inserted in the hub 2. For situations in which rotary vibrations are transmitted to the gear wheel 1 by the drive causing the annular disc 8 to rotate slowly, resulting in wear on the shaft-retaining ring 9 and an easing in the contact pressure, an annular groove 10 is formed in the outer peripheral region of the web 5 as illustrated in the top part of the gear wheel 1, in which a rubber ring 11 is inserted. It projects far enough out from the side face 7 by a distance necessary to inhibit the rotating movement of the annular disc 8 but without preventing the annular disc 8 from being applied with its full face against the side face 7 under the contact pressure of the shaft-retaining ring 9. Instead of using a rubber ring 11 to prevent the annular disc 8 from rotating, a clamping sleeve 12 could be used in the web 5, as illustrated in the bottom part of the gear wheel 1.

Another possible way of applying the annular disc 8 against the side face 7 with a specific contact pressure is illustrated in the bottom part of the gear wheel 1. In this version, a ring 13 is pushed onto the hub 2 with an appropriate axial force, lying against the annular disc 8.

What is claimed is:

1. A gear wheel assembly comprising:
    a gear wheel including a hub having a bore formed therethrough, a web extending about the hub, and a ring gear extending about the web, the web defining a side face,
    means to reduce noise generated by vibration of the gear wheel, said means comprising at least one disc-shaped vibration damping mass defining a face and a continuous outer annular surface, and
    coupling means supported on the hub for coupling the vibration damping mass to the web of the gearwheel, wherein the coupling means includes a resilient element that couples the vibration damping mass to the web of the gear wheel such that substantially the full face of the vibration damping mass is in direct contact with a predominant portion of the side face of the web of the gear wheel and the continuous outer annular surface is positioned radially inwardly of the ring gear, and wherein the resilient element causes the vibration damping mass to be forced against the web of the gear wheel with a selected contact pressure.

2. An assembly according to claim 1, wherein the vibration damping mass is in the form of at least one annular disc.

3. An assembly according to claim 1, wherein the annular disc is retained on said hub.

4. An assembly according to claim 3, wherein the annular disc is forced against the face of the gear wheel under the force generated by said resilient element.

5. An assembly according to claim 4, wherein the element is a retaining ring.

6. An assembly to claim 5, wherein the retaining ring is pushed onto the hub.

7. An assembly according to claim 5, wherein the retaining ring is resilient and pre-tensioned such that when positioned on the hub, with the vibration damping mass in place, the resilient ring generates said force.

8. An assembly according to claim 1, further comprising locking means to prevent the vibration damping mass from rotating relative to the gear wheel.

9. An assembly according to claim 8, wherein the locking means comprises a pin member located in aligned bores in the gear wheel and vibration damping mass.

10. An assembly according to claim 8, wherein the locking means comprises an element having a high co-efficient of friction embedded into to the gear wheel and protruding therefrom.

11. An assembly according to claim 10, wherein the element is embedded in the front face of the gear wheel.

12. An assembly according to claim 1, wherein the vibration damping mass disc is mounted in a recess of the gear wheel.

13. An assembly according to claim 1, wherein the vibration damping mass is made from a material with a Young's modulus comparable with that of the material of the gear wheel.

14. A gear wheel assembly comprising:
    a gear wheel including a hub having a bore formed therethrough, a web extending about said hub, and a ring gear extending about said web, said web having a side face;
    a disc-shaped vibration damping mass supported on said hub and including a face and a continuous outer annular surface, wherein substantially all of said face of said vibration damping mass is in direct contact with a predominant portion of said side face of said web, and wherein said continuous outer annular surface of said vibration damping mass is positioned radially inwardly of said ring gear; and
    a resilient element supported on said hub and causing said face of said vibration damping mass to be forced against said side face of said web with a selected contact pressure.

15. The gear wheel assembly defined in claim 14 wherein said resilient element is a retaining ring.

16. The gear wheel assembly defined in claim 15 wherein said retaining ring is supported in a groove formed in said hub.

17. The gear wheel assembly defined in claim 14 further including a structure that prevents said vibration damping mass from rotating relative to said gear wheel.

18. The gear wheel assembly defined in claim 17 wherein said structure includes a ring that engages said vibration damping mass and said gear wheel.

19. The gear wheel assembly defined in claim 18 wherein said ring is formed from rubber.

20. The gear wheel assembly defined in claim 19 wherein said rubber ring is disposed within a groove formed in said web.

21. The gear wheel assembly defined in claim 17 wherein said structure is disposed within a groove formed in said web of said gear wheel.

22. The gear wheel assembly defined in claim 14 wherein said structure is a sleeve that extends through said vibration damping mass and said web.

23. A gear wheel assembly comprising:
    a gear wheel including a hub having a bore formed therethrough, a web extending about said hub, and a ring gear extending about said web, said web having a side face;
    a disc-shaped vibration damping mass supported on said hub and including a face and a continuous outer annular surface, wherein substantially all of said face of said vibration damping mass is in direct contact with a predominant portion of said side face of said web, and wherein said continuous outer annular surface of said vibration damping mass is positioned radially inwardly of said ring gear;

an element supported on said hub and causing said face of said vibration damping mass to be forced against said side face of said web with a selected contact pressure; and a structure that prevents said vibration damping mass from rotating relative to said gear wheel, said including one of (a) a ring that engages said vibration damping mass and said web of the gear wheel and (b) a sleeve that extends through said vibration damping mass and said web.

24. The gear wheel assembly defined in claim 23 wherein said element is a resilient element.

25. The gear wheel assembly defined in claim 24 wherein said resilient element is a retaining ring.

26. The gear wheel assembly defined in claim 25 wherein said retaining ring is supported in a groove formed in said hub.

27. The gear wheel assembly defined in claim 23 wherein said structure includes a ring that engages said vibration damping mass and said gear wheel.

28. The gear wheel assembly defined in claim 27 wherein said ring is formed from rubber.

29. The gear wheel assembly defined in claim 28, wherein said rubber ring is disposed within a groove formed in said web.

30. The gear wheel assembly defined in claim 23 wherein said structure is disposed within a groove formed in said web of said gear wheel.

31. The gear wheel assembly defined in claim 23 wherein said structure is a sleeve that extends through said vibration damping mass and said web.

* * * * *

UNITED STATES PATENT AND TRADEMARK OFFICE
CERTIFICATE OF CORRECTION

PATENT NO. : 6,755,094 B2
DATED : June 29, 2004
INVENTOR(S) : Winfried Rehle et al.

It is certified that error appears in the above-identified patent and that said Letters Patent is hereby corrected as shown below:

Column 3,
Line 51, replace "claim 1" with -- claim 2 --

Column 5,
Line 12, insert the word -- structure -- after the word "said"
Line 14, replace the word "the" with the word -- said --

Signed and Sealed this

Tenth Day of August, 2004

JON W. DUDAS
*Acting Director of the United States Patent and Trademark Office*